United States Patent

McMurtrey et al.

[11] Patent Number: 6,076,424
[45] Date of Patent: Jun. 20, 2000

[54] MULTI-PIECE JACK HANDLE

[75] Inventors: David K. McMurtrey; Dennis P. Pawsat, both of Maysville, Ky.

[73] Assignee: Wald Manufacturing Co., Inc., Maysville, Ky.

[21] Appl. No.: 09/008,191

[22] Filed: Jan. 16, 1998

Related U.S. Application Data

[63] Continuation-in-part of application No. 08/884,900, Jun. 30, 1997, Pat. No. 5,878,627.

[51] Int. Cl.⁷ .............................. G05G 1/00; B66F 3/22; F16B 7/10
[52] U.S. Cl. .................. 74/544; 74/543; 254/DIG. 3; 254/122; 403/108; 403/328; 403/329; 81/177.6; 81/124.7; 24/615
[58] Field of Search .............................. 74/546, 526, 527; 403/108, 328, 329; 24/615, 616, 573.1, 607; 285/308; 81/124.2–124.7, 177.6; 254/122, DIG. 3

[56] References Cited

U.S. PATENT DOCUMENTS

| | | |
|---|---|---|
| 1,014,009 | 1/1912 | Koons . |
| 1,245,921 | 11/1917 | Holdren . |
| 1,262,483 | 4/1918 | Hall . |
| 1,269,359 | 6/1918 | Young . |
| 1,286,161 | 11/1918 | Wagner . |
| 1,422,279 | 7/1922 | Lydick . |
| 1,453,989 | 5/1923 | Norlund . |
| 1,498,602 | 6/1924 | Adell . |
| 1,501,605 | 7/1924 | Lane . |
| 1,503,087 | 7/1924 | Brown . |
| 1,518,627 | 12/1924 | Wills . |
| 1,520,989 | 12/1924 | Webster . |
| 1,531,732 | 3/1925 | Burkholder . |
| 1,597,347 | 8/1926 | Fildes . |
| 1,810,715 | 6/1931 | Larson et al. . |
| 1,989,823 | 2/1935 | Raabe . |
| 2,254,085 | 8/1941 | Nilson . |
| 2,318,108 | 5/1943 | Schramm . |
| 2,484,401 | 10/1949 | Coie .......................................... 135/53 |
| 2,671,636 | 3/1954 | Olson . |
| 3,469,864 | 9/1969 | Guerrero . |
| 3,807,693 | 4/1974 | Castoe . |
| 3,980,805 | 9/1976 | Lipari ................................. 403/378 X |
| 4,333,505 | 6/1982 | Jones et al. . |
| 4,514,108 | 4/1985 | Sagady . |
| 4,539,003 | 9/1985 | Tucker . |
| 4,564,172 | 1/1986 | Arzouman . |
| 4,586,696 | 5/1986 | Mugford et al. . |
| 4,607,406 | 8/1986 | Davis ................................. 81/177.6 X |
| 4,631,056 | 12/1986 | Dye . |
| 4,711,595 | 12/1987 | Magid et al. . |
| 4,749,169 | 6/1988 | Pickles ..................................... 254/122 |
| 4,765,009 | 8/1988 | Hung .................................. 81/124.7 X |
| 4,826,486 | 5/1989 | Palsrok et al. . |
| 4,920,592 | 5/1990 | Scott ........................................... 7/100 |
| 4,997,421 | 3/1991 | Palsrok et al. . |
| 5,237,890 | 8/1993 | Gill . |
| 5,297,670 | 3/1994 | Yamaguchi . |
| 5,301,389 | 4/1994 | Engel et al. . |
| 5,381,707 | 1/1995 | Gill . |
| 5,433,127 | 7/1995 | Messier . |

FOREIGN PATENT DOCUMENTS 2030107  4/1980  United Kingdom .

Primary Examiner—Vinh T. Luong
Attorney, Agent, or Firm—Wood, Herron & Evans, L.L.P.

[57] ABSTRACT

A two-piece handle for use in positioning a vehicle lifting jack beneath a vehicle and rotating a spindle of that jack. The two-piece jack handle includes a jack handle rod having one end for engaging the jack spindle and a sleeve secured to an opposite end. The sleeve has a cavity configured to receive in driving engagement one end of the jack handle rod extension. A clip slidably mounted on the first end of the jack handle rod extension is slidable over the coupling and releasably connectable to the jack handle rod to releasably secure the jack handle rod and jack handle rod extension in coaxial alignment.

25 Claims, 5 Drawing Sheets

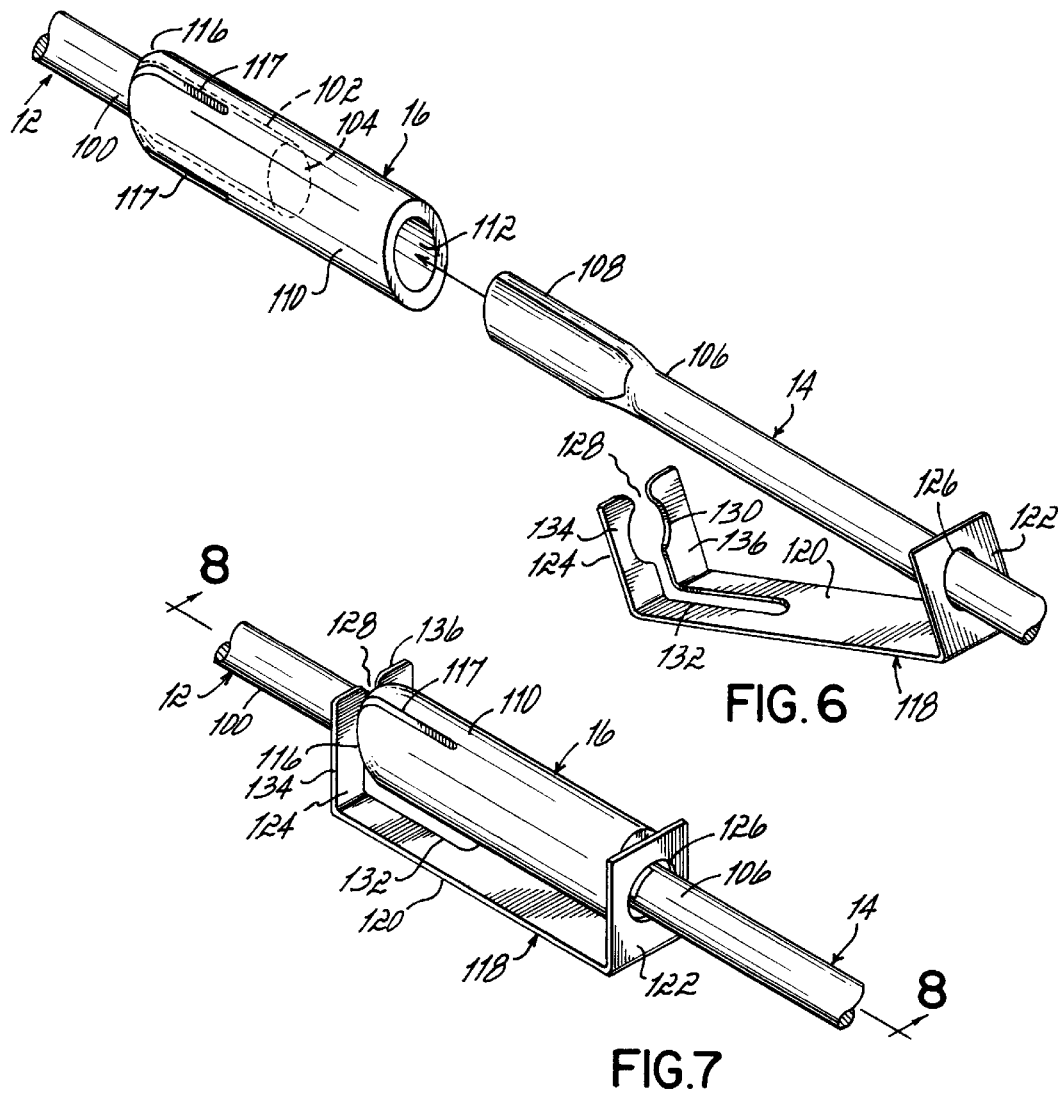
FIG. 6
FIG. 7
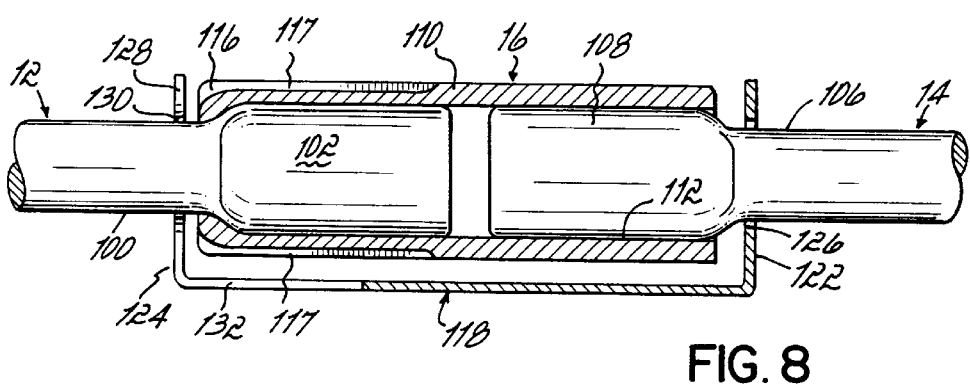
FIG. 8

MULTI-PIECE JACK HANDLE

This application is a continuation-in-part of U.S. patent application Ser. No. 08/884,900, filed Jun. 30, 1997, for a TWO-PIECE JACK HANDLE now U.S. Pat. No. 5,878,627 issued on Mar. 9, 1999. This application and application Ser. No. 08/884,900 have the same assignee.

BACKGROUND OF THE INVENTION

This invention relates to vehicle jacks and, more particularly, to an improved handle for actuating such jacks.

Motor vehicles have traditionally been equipped with a spare wheel to use in the event that one of the tires became flat or disinflated. Along with a spare wheel, some means for raising the vehicle in order to change the wheel must be provided. This means of lifting the vehicle has usually been some form of vehicle jack.

Some vehicle jacks have heretofore been designed to be positioned underneath the vehicle, usually just to the inside of the tire to be changed and the designated lifting point is generally the axle or other nearby wheel support structure. These jacks may be either of a scissors-type or a telescoping-type and normally utilize a screw drive. In both cases, a rotary force is applied to the screw drive to either raise or lower the vehicle depending upon whether the rotary motion is clockwise or counterclockwise.

To impart that rotary motion to the jack, a handle is attached to the jack spindle both to transmit the rotary motion to the jack and to help position the jack at the proper lifting location underneath the vehicle. The jack handle must be long enough to reach from the perimeter of the vehicle to the jack which is positioned underneath the vehicle while still allowing enough room for the operator to apply the rotary motion to the end of the handle remote from the jack.

Jack handles are known which are of a one piece rod construction with a tip formed on one end to engage the jack spindle and a crank handle formed on the other end by two 90° bends. Since a one piece handle has a relatively long fixed length, a suitable location must be found to store the handle inside the vehicle.

Other known handles are made of two pieces and then permanently fastened together at the ends of the two pieces. The connection between the two pieces is usually a rivet or other similar permanent connector which allows the two sections to fold or pivot 180° when not in use so as to require only about half the storage space required for a one-piece handle. Examples of such two-piece handles are to be found, for example, in U.S. Pat. Nos. 2,254,085; 2,318,108; and, 4,586,696.

Handles are also made in two sections which are temporarily connected together to operate the jack and then separated into two pieces for storage. One such jack is disclosed in U.S. Pat. No. 2,671,636. Another such handle is currently in use in a 1997 Jeep Wrangler. This Jeep Wrangler jack handle comprises two pieces, one identified as a jack handle and the other as a jack handle extension, both of which are made from solid rod or wire. The connection of the two sections is accomplished by flattening one end of the jack handle so as to enable that flattened jack handle section to be received within an upset or enlarged end and an internal cavity of the jack handle extension. The two sections of the Jeep Wrangler jack handle are connected by inserting the flattened end of the jack handle into the cavity in the opposite upset or enlarged end of the jack handle extension. In order to maintain the two sections in assembled relationship, so as to enable the jack to be pulled or pushed to position or remove the jack from underneath the vehicle, a thumb screw extends through the upset or enlargement on the jack handle extension into engagement with the flattened end of the jack handle.

All of the jack handles heretofore described suffer from one deficiency or another. The one-piece jack handle requires too long a storage space to be practical for many applications. The two-piece permanently pivotally connected jack handles are relatively expensive, difficult to operate, and subject to breakage, and the two-piece separable jack handles heretofore described are relatively complex and expensive and require specialized and expensive machinery for manufacture. It is therefore an object of this invention to provide a two-piece jack handle which overcomes all of these limitations and which may be economically fabricated from wire rod.

It is another object of this invention to provide a two-piece jack handle in which the two pieces may be easily and quickly connected and disconnected.

Still another object of this invention is to provide a two-piece jack handle which meets these other objectives, but which also includes a connection at the end of the jack handle extension which may be used for the auxiliary purpose of operating a winch mechanism for raising and lowering a spare wheel stored on the underside of a vehicle.

SUMMARY OF THE INVENTION

The present invention provides a relatively inexpensive and efficient two-piece jack handle which may be easily and conveniently stored when not in use, but which may be quickly and easily assembled for use as a jack handle. The jack handle also has the advantages of being relatively inexpensively manufactured from wire rod utilizing relatively inexpensive tooling.

According to the principals of the present invention and in accordance with the preferred embodiments, the two-piece jack handle includes a jack handle rod having a formed tip adapted to engage and transmit rotary motion from the jack handle rod to a rotatable spindle of a vehicle lifting jack. The handle further includes a jack handle rod extension having a noncircular cross-sectional portion on a first end. A jack handle coupling is used to releasably connect the jack handle rod and the jack handle rod extension in coaxial alignment. The coupling includes a sleeve secured to the opposite end of the jack handle rod, the sleeve having a cavity configured to receive the noncircular cross-sectional portion of the first end of the jack handle rod extension. The coupling further includes a clip extending over the sleeve and being simultaneously attachable to the jack handle rod extension and the jack handle rod thereby releasably connecting the jack handle rod and the jack handle rod extension in coaxial alignment.

In one aspect of the invention, the clip is generally U-shaped and has a hole in one leg sized to receive the jack handle rod extension. The clip further includes a slotted opening in its opposite leg that is sized to snap over the jack handle rod. Thus, upon inserting the first end of the jack handle rod extension into the cavity in the sleeve, the clip is slidingly positioned over the sleeve and snapped into place on the jack handle rod thereby releasably securing the jack handle pieces in coaxial alignment.

These and other objects and advantages of the present invention will become more readily apparent during the following detailed description taken in conjunction with the drawings herein.

BRIEF DESCRIPTION OF THE DRAWINGS

FIG. 6 is a partial perspective view illustrating the individual components of an alternative embodiment of the coupling for connecting the ends of the two jack handle pieces together in accordance with the principles of this invention.

FIG. 7 is a partial perspective view illustrating the assembled coupling of the alternative embodiment.

FIG. 8 is a cross-sectional view taken along line 8—8 of FIG. 7 illustrating the ends of the two jack handle pieces within the assembled coupling of the alternative embodiment.

DETAILED DESCRIPTION OF THE INVENTION

Figures 1, 2:
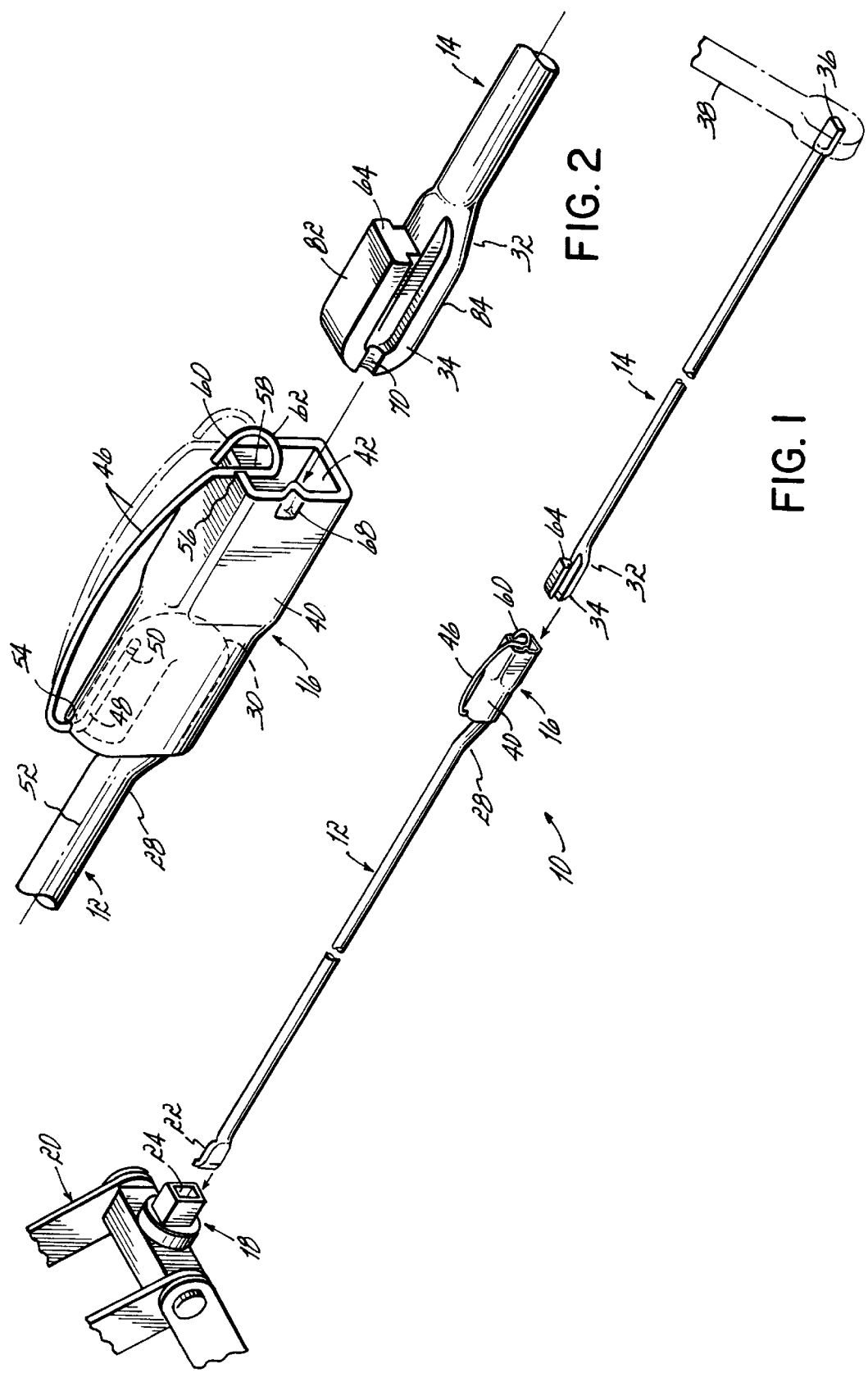
FIG. 1 is a perspective view of a two-piece jack handle incorporating one embodiment of this invention.
FIG. 2 is an enlarged perspective view of a portion of the jack handle of FIG. 1.

The two-piece jack handle 10 of this invention is illustrated in an exploded perspective view in FIG. 1 as comprising a jack handle rod 12 and a jack handle rod extension 14. In this embodiment, both of these pieces of the jack handle 10 are manufactured from circular cross-section wire rod, but they could as well be manufactured from square or other cross-section wire. This jack handle, when the two pieces 12 and 14 are coupled together via a jack handle coupling 16, may be used to rotate a conventional jack spindle 18 of a vehicle jack 20. The jack 20 forms no part of the invention of this application, and therefore, only a portion thereof has been illustrated in the drawings of this application. This jack may be any conventional jack, such as a conventional scissors style or telescoping style jack.

Figure 3:
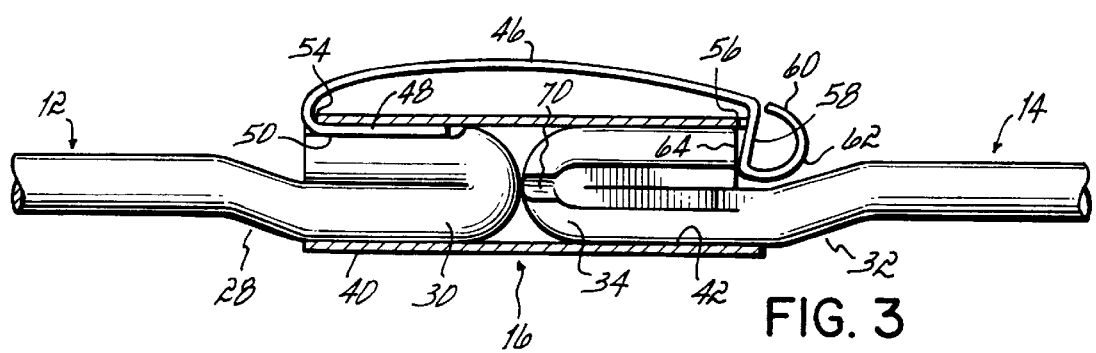
FIG. 3 is a cross-sectional view taken through the jack handle coupling of the jack handle of FIG. 1, but illustrating the handle in an assembled or coupled relationship.

As illustrated in FIG. 1, the jack handle rod 12 has a formed tip 22 on one end, which formed tip is of conventional shape and adapted to be received within a receptacle 24 of the jack spindle 18. At the opposite end of the jack handle rod 12 from the formed tip 22, a short end section 28 of the rod is bent 180° into a J-shape or so-called formed knuckle joint 30, as best shown in FIGS. 2 and 3.

The jack handle rod extension 14 similarly has an end section 32 bent 180° into a J-shaped end or knuckle joint 34.

At its opposite end, the jack handle rod extension 14 has a flat 36 formed thereon, which flat 36 is adapted to cooperate with a conventional rotatable handle 38 for effecting rotation of the jack handle rod extension 14. The handle 38 forms no part of this invention, and therefore, has been illustrated in phantom in FIG. 1 and in solid lines in FIG. 4.

The jack handle coupling 16 which is intended to releasably connect or couple the two pieces 12 and 14 of the jack handle comprises a short piece of metal tubing 40, which after being cut to length, is shaped by two arbors (not shown), each of which has a cross-section which matches the corresponding cross-section of the knuckle joints 30, 34. These arbors are forced into opposite ends of the tubing, shaping the inside of the tubing or sleeve 40 to match the corresponding outside shape of each knuckle joint 30, 34, respectively. The inside dimensions of the end of the tube or sleeve 40 which is assembled onto the knuckle joint 30 on the jack handle rod 12 is sized slightly smaller than the corresponding dimension on the knuckle joint 30, such that an interference fit is created when the sleeve is forced over the knuckle joint 30. This interference or force fit of the sleeve 40 over the knuckle joint 30 of the jack handle rod 12 ensures that the two pieces are permanently connected.

The inside dimensions on the end of the tube or sleeve which is to be mated with the knuckle joint 34 on the jack handle extension are slightly larger than the corresponding exterior dimensions on the knuckle joint 34, such that a sliding fit or slip-fit is created between the two when the knuckle joint 34 is inserted into the shaped internal receptacle 42 of the sleeve 40. This slip-fit enables the knuckle joint 34 on the end of the jack handle extension to be freely inserted and removed from the coupling sleeve 40. Generally, both ends of the tube or sleeve 40 are rectangularly shaped, such that the non-circular cross-sections of the knuckle joints 30, 34 and sleeve ends enable the connections to transmit applied torque from the jack handle extension to the jack handle and subsequently to the spindle 18 of the jack 20 without slippage or rotation at the connections.

With reference to FIG. 2, it will be seen that the jack handle coupling 16 includes a wire spring 46 which functions to latch the two pieces of the jack handle in an assembled relationship when the jack handle rod extension 14 is fully inserted into the internal receptacle 42 of the coupling sleeve 40. This wire spring 46 has an end section 48 located interiorly of the end coupling sleeve 40 and residing within a groove 50 formed on the top side of the knuckle joint 30 with the end 48 of the spring extending parallel to the center line of the jack handle. The end 48 of the wire spring extends upwardly from within the tube through a notch 54 in one end of the tube or sleeve 40 and then extends for the length of the tube toward the opposite end. At the opposite end 58 of the wire spring, it is bent inwardly so as to pass through a notch 56 at the opposite end of the tube or sleeve. After passing through the notch 56 of the sleeve 40, the end 58 of the wire spring extends inwardly into the receptacle 42 of the sleeve and then outwardly in a semi-circular bend to an end 60.

The two notches 54, 56 in the top of the sleeve 40 reside in a common plane which passes radially through the center line or axis 52 of the jack handle rod 12. When the coupling sleeve 40 is pressed onto and over the knuckle joint 30, the end 48 of the wire spring is hooked inside the coupling sleeve and aligns with the groove 50 formed in the top of the knuckle joint 30. The groove is of a depth such that pressure between the groove in the knuckle joint and the inside surface of the connector tube securely hold the spring 46 in an assembled relationship between the sleeve and the knuckle joint.

In order to assemble or connect the two handle rods 12 and 14 by means of the coupling 16, either the free end section 58 of the spring can be lifted up and out of the notch 56 on the connector tube and moved to the side of the coupling sleeve 40 as best illustrated in phantom in FIG. 2, or the knuckle joint may be used as a cam against the sloping end section 62 of the wire spring to nudge or cam the wire spring upwardly out of the way of the knuckle joint as the knuckle joint 34 of the handle extension is inserted into the coupling sleeve 40. Once the knuckle joint 34 of the handle extension rod has been fully inserted into the coupling sleeve 40, the free end 58 of the wire spring either snaps downwardly automatically over the flat end surface 64 of the knuckle joint as illustrated in FIG. 3, or is physically lifted from against the side of the coupling sleeve and moved into the notch so as to position the end portion 58 of the spring against the flat surface 64 of the knuckle joint 34. When the spring is located in the position illustrated in FIG. 3, it blocks inadvertent removal of the knuckle joint of the handle rod extension 14 from the coupling.

In order to ensure that the handle extension rod 14 is always inserted with the flat surface 64 in a position to be engaged by the free end 58 of the wire spring 46, an internal detent 68 is formed on one side of the open end of the coupling sleeve 40 approximately 90° removed from the top spring receiving notch 56. A corresponding groove 70 is provided along one side of the knuckle joint 34 of the handle extension rod which thus provides an open channel for the entire length of the knuckle joint 34. When the knuckle joint 34 is inserted into the coupling sleeve 40, the detent 68 rides within the groove 70 and thereby ensures that the knuckle joint is always inserted with the flat surface 64 on the top side of the knuckle joint in a position to be engaged by the end of the spring 58.

If neither the jack handle rod 12 or the jack handle extension rod 14 are to be used for any auxiliary purpose other than raising and lowering the jack 20, then both knuckle joints are most economically formed by simply folding over the round cross-section wire in the manner that the end section 28 of jack handle rod 12 is folded over through 180° into a J-shaped configuration. If on the other hand the jack handle extension 14 has other functions as, for example, to rotate a winch actuating tube 76 for raising and lowering a spare tire 71 as illustrated in FIGS. 4 and 5, then the cross-sectional shape of the knuckle joint 34 is preferably configured so as to perform the auxiliary function and yet still mate with the coupling sleeve 40.

Figure 4:
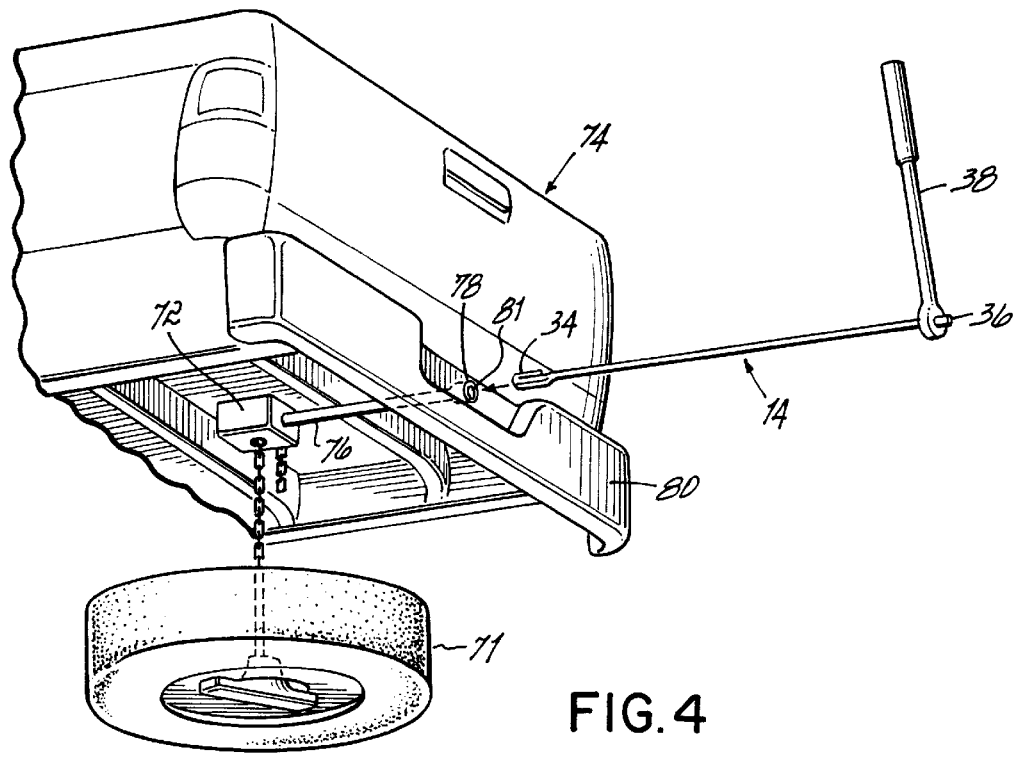
FIG. 4 is a perspective view of one piece of the jack handle of this invention utilized to actuate a spare tire winch located on the underside of a motor vehicle.
Figure 5:
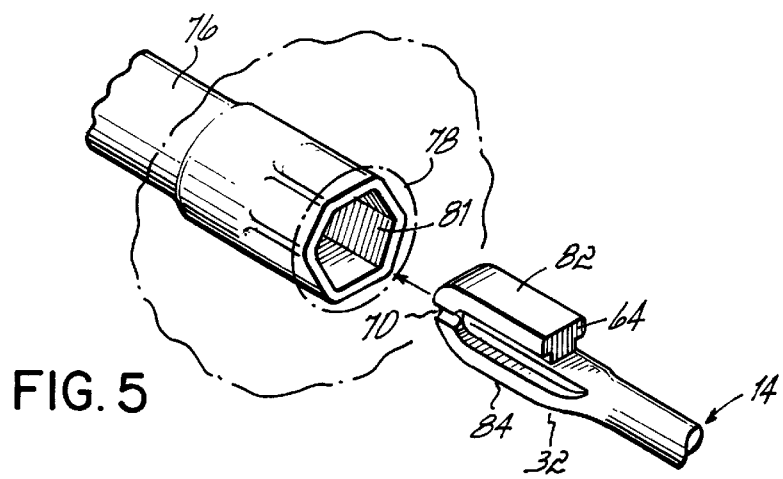
FIG. 5 is an enlarged perspective view of a portion of the jack handle and winch drive tube of FIG. 4.

As illustrated in FIGS. 4 and 5, one such auxiliary function of the jack handle extension rod is to raise and lower the spare wheel 71 via a winch 72 mounted on the underside of a vehicle 74. Generally, such a winch 72 is operated via the tube 76 which extends from the winch to and through a hole 78 in the body of the vehicle and located above the rear bumper 80. The exposed end of the tube 76 generally has an internal hexagon shape 81. In order to mate with that hexagon-shaped internal receptacle of the tube 76, the knuckle joint 34 on the jack handle extension rod must mate with all or part of this internal hexagonal configuration so as to transmit torque to operate the winch. To that end, the knuckle joint 34 of the jack handle extension rod is first formed into a generally T-shaped cross-section prior to being bent 180° into the J-shaped knuckle joint. When the 180° bend is placed in the handle extension rod 14, the bottoms of the two T-shaped cross-sections touch, and the tops 82, 84 of the two T-shaped cross-sections form two parallel flat surfaces which are alignable and engageable with two of the opposed sides of the internal hexagonal-shaped receptacle 81 of the winch actuating tube 76.

In the operation of the jack handle heretofore described, the jack handle extension rod 14 would generally first be used to lower the spare wheel 71 via the winch 72 from beneath the underside of the vehicle 74. After the spare wheel is removed from its connection to the winch, the jack handle rod extension 14 is removed from engagement with the winch tube 76 and coupled to the jack handle rod 12 via the jack handle coupling 16. This involves no more than sliding the knuckle joint 34 of the jack handle rod extension 14 into the shaped internal receptacle 42 of the coupling sleeve 40 until the wire spring 46 snaps down over and engages the flat surface 64 of the knuckle joint 34. The rotatable handle 38 of the jack may then be slipped over the shaped end 36 of the jack handle extension rod and the formed tip 22 of the jack handle rod 12 inserted into the spindle receptacle of the jack. So assembled, the jack handle 38 may be rotated and through the coupling 16 transmit torque to the spindle of the jack.

After completion of the use of the jack 20, the formed tip of the jack handle rod may be removed from engagement with the receptacle of the spindle 18 of the jack and the coupling 16 disconnected for convenient storage of the two pieces 12, 14 of the jack handle.

An alternative embodiment of the coupling 16 connecting the ends of the jack handle rod 12 and jack handle rod extension 14 is illustrated in FIG. 6. The opposite end 100 of the jack handle rod 12 has an end section 102 that has been formed by stamping, rolling, etc. into a shape having a non-circular, for example, an oval or elliptical cross-sectional area 104. A first end 106 of the jack handle rod extension 14 has an identically formed end portion or section 108. As will be appreciated, the non-circular cross-section 104 may also be a multilateral cross-section, for example square, hexagonal, etc.

The jack handle coupling 16 which releasably connects or couples the ends 100, 106 of the respective jack handle pieces 12, 14 includes a sleeve made from a short piece of metal tubing 110. After being cut to length, the metal tubing is shaped such that its internal throughbore 112 has a cross-sectional shape sized to slidingly receive the end sections 102, 108 of the respective jack handle pieces 12, 14. The size of the cross-sectional area 104 of the bore 112 should permit the end sections 102, 108 of the respective rods 12, 14 to slip fit, that is, readily slide within the bore 112. Normally, the tubing 110 is slid over the end section 102 and the end 116 of the tubing 110 is crimped to tightly lock or fix the tubing 110 onto the end 100 of the jack handle rod 12. The crimping process often forms ridges 117 on the exterior of the sleeve 110.

In the alternative embodiment of FIG. 6, the coupling 16 further includes a clip or strap 118. The clip is generally a sheet metal stamping; however, as will be appreciated, the clip 118 may be made from other materials and formed using other processes. The clip 118 is generally U-shaped with a base 120 having a length that is greater than the length of the tubing 110. Extending from the ends of the base 120 are opposed legs 122, 124. The leg 122 has a hole greater than the diameter of the first end 106 of the jack handle rod extension 14 but less than the major diameter of the elliptical cross-section 104 of the end section 108. Thus, the clip 118 is able to slide freely over the end 106 of the jack handle rod extension 14 but is prohibited from sliding over the end section 108. The leg 124 includes a slot 128 that has an arcuate portion 130 that is sized to receive the end 100 of the jack handle rod 12. The slot 128 has a further portion 132 extending beyond the arcuate portion 130 to provide the slot sides 134, 136 with a resilient motion. The slot portion 128 is designed to permit the end 124 of the clip 118 to be manually pushed onto and releasably secured on the opposite end 100 of the jack handle rod 12.

To connect the jack handle rod 12 with the jack handle rod extension 14, the end section 108 is inserted into the bore 112; thereafter, the clip 118 is slid along the end 106 of the jack handle rod extension 14 and over the sleeve 110, thereby capturing the sleeve 110 between the ends 122, 124 of the clip 118. The end 124 of the clip 118 is then pushed onto the opposite end 100 of the jack handle rod 12 and snugly retained thereon. Thus, the clip 118 blocks the end 108 of the jack handle rod extension 14 from separating from, or moving out of, the cavity 112 of the sleeve 110. Thus, by preventing the jack handle rod extension 14 from moving longitudinally with respect to, the jack handle rod 12, the two jack handle pieces 12, 14 are coupled together in coaxial alignment as illustrated in FIGS. 7 and 8. Thereafter, to release the clip 118 from the jack handle rod 12, the end 124 of the clip 118 is pulled off of the end 100 of the jack handle rod 12. The clip is then slid away from the sleeve 110, and the jack handle rod extension 14 may easily be separated from the jack handle rod 12.

Figure 9:
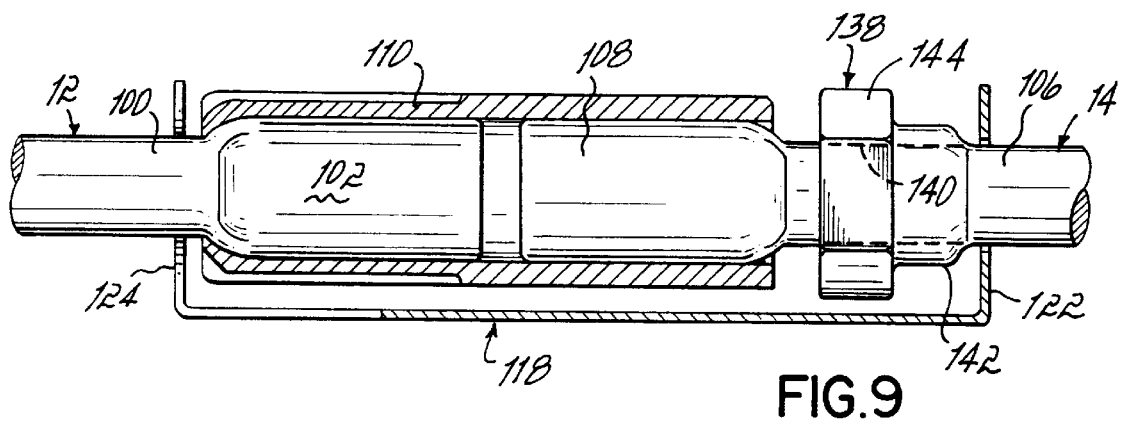
FIG. 9 is a cross-sectional view illustrating the assembled coupling of the alternative embodiment and further illustrating a winch drive on the end of one of the jack handle pieces.
Figure 10:
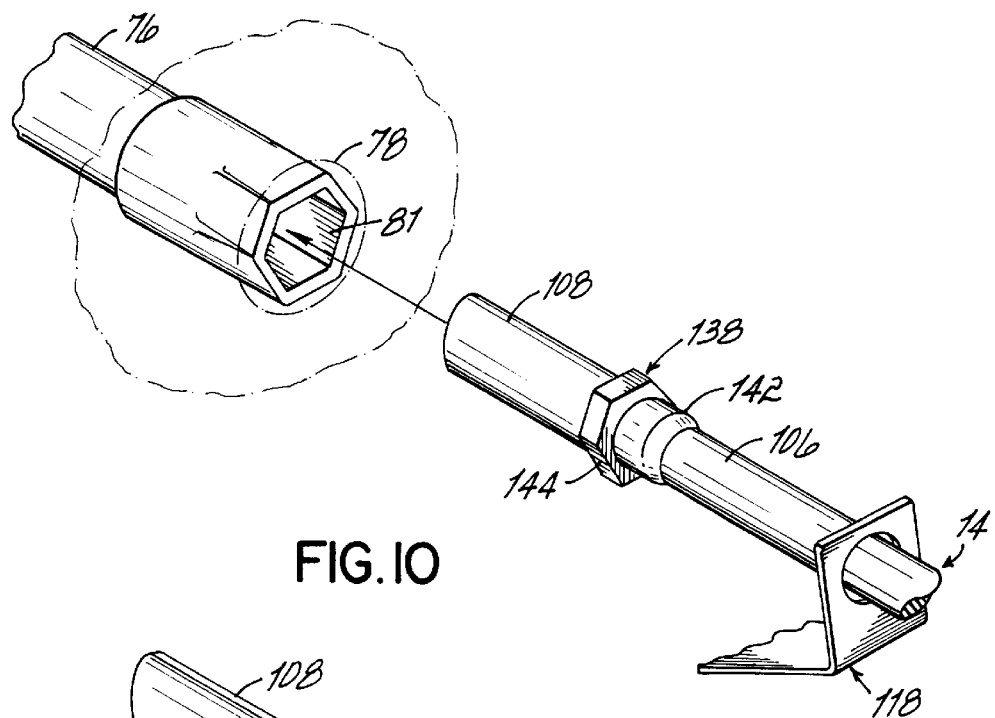
FIG. 10 is a partial perspective view of portions of an end of one of the jack handle pieces and a winch drive tube.

As previously described with respect to FIG. 4, the jack handle extension rod 14 can be used to raise and lower a spare wheel 71 by means of a winch 72 mounted on the underside of a vehicle 74. Generally, the winch 72 is operated by a tube 76 extending from the winch and having an internal hexagon shaped bore 81 at its end. FIGS. 9 and 10 illustrate an alternative embodiment for shaping the end 106 of the jack handle extension rod 14 so that the extension rod 14 may be used to operate the winch 72. In this embodiment, a plate 138 has an internal bore 140 that is sized to receive the end 106 of the jack handle rod extension 14. The plate 138 is slid over the jack handle rod extension 14 and is secured in place by means of a weld 142. The plate 138 provides a portion of the jack handle rod extension 14 with an external profile 144, for example, a hexagon profile, that is sized to slip fit within the hexagon opening 81 in the tube 76 of the winch 72. As will be appreciated, the plate 138 may be stamped from a sheet metal blank, machined from either round or hexagon bar or wire stock, or manufactured by a cold heading process. In addition, the plate 138 may be brazed, crimped or fixed in place on the end section 106 of the rod extension 14 by other known processes.

Figure 11:
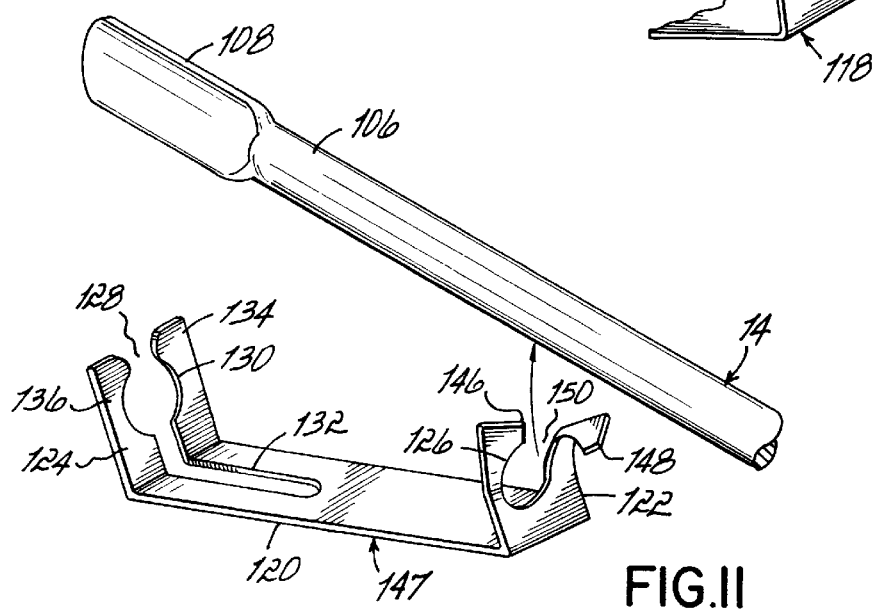
FIG. 11 is a disassembled perspective view illustrating an alternative embodiment of a clip portion of the coupling illustrated in FIG. 6.

FIG. 11 illustrates alternative embodiment of the clip 147 in which the end 122 of the clip 147 has a cut 146 extending from the end of the clip to the hole 126. One of the sides 148 of the end 122 may then be bent to provide an opening 150 sized to receive the end 106 of the jack handle rod extension 14. After the clip is mounted on the rod extension 14, the side 148 is bent back to its original position, thereby slidingly securing the clip 147 to the rod extension 14.

Figure 12:
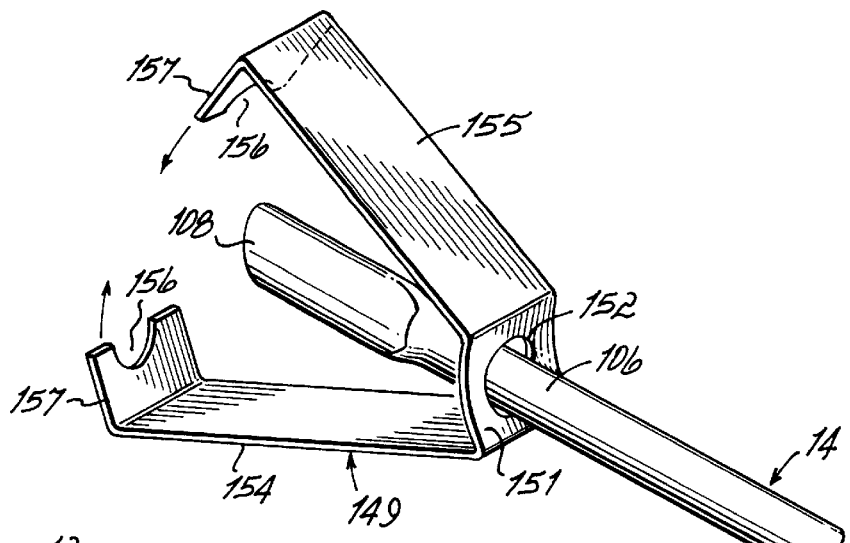
FIG. 12 is a perspective view of a further alternative embodiment of the clip portion of the coupling illustrated in FIG. 6.

Referring to FIG. 12, another embodiment of the clip 149 has a base side 151 with a hole 152 sized to receive the end 106 of the jack handle rod extension 14. Two opposed sides or legs 154, 155 have a length greater than the length of the sleeve 110 (FIG. 6). The clip 149 is manufactured such that the legs 154, 155 are biased toward a clamped position in which the ends 157 are immediately adjacent each other and may be in contact. To assemble the coupling, the legs 154, 155 are pulled apart, against the biasing force, to the position illustrated in FIG. 12; and the jack handle rod extension 14 is inserted into the sleeve 110 of the jack handle rod 12. Thereafter, the legs 154, 155 are released, and the normal biasing force pulls the legs 154, 155 together until openings 156 of the ends 157 of the legs 154, 155 are positioned over the jack handle rod 12. When in that position, the clip 149 extends over opposite sides of the sleeve 110 and prevents relative longitudinal motion between the jack handle rod 12 and the jack handle rod extension 14.

Figure 13:
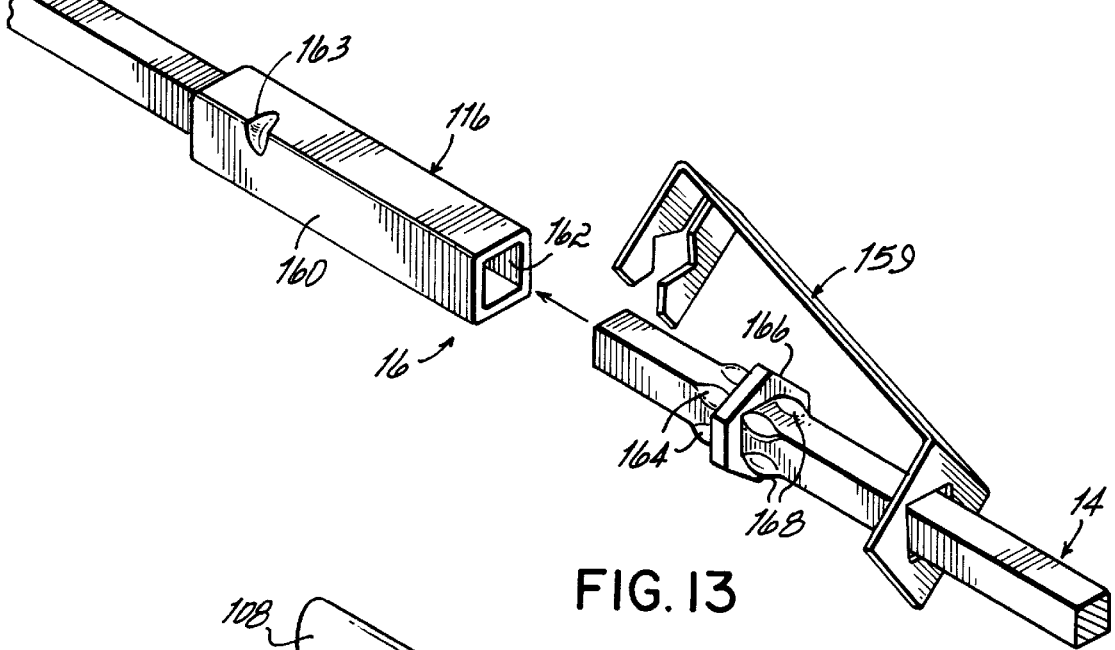
FIG. 13 is a partial perspective view illustrating a further alternative embodiment of the ends of the two jack handle pieces and a coupling for connecting those pieces together.

FIG. 13 illustrates an embodiment in which the jack handle pieces 12, 14 are manufactured from multilateral, for example, quadrilateral, pieces of bar or rod stock. Similarly, the sleeve 160 of the coupling 116 is also manufactured from a multilateral, for example, quadrilateral, tubing stock. The sleeve 160 has an internal opening 162 with a quadrilateral cross-section sized to receive the quadrilateral cross-sections of the ends of the jack handle rod 12 and jack handle rod extension 14. After inserting the jack handle rod 12 into the sleeve 160, a notch 163 is stamped into an external surface of the sleeve 160 thereby locking the sleeve 160 onto the jack handle rod 12. The end of the jack handle rod extension 14 may also be stamped or crimped to provide dimples or wings 164, 168 which are located on opposite sides of a hexagonal plate 166, thereby locating and securing the plate 166 at the desired location on the jack handle rod extension 14. The slots and holes in the clip 159 are also quadrilateral to match the cross-sectional quadrilateral shape of the jack handle rod 12 and jack handle rod extension 14.

Figure 14:
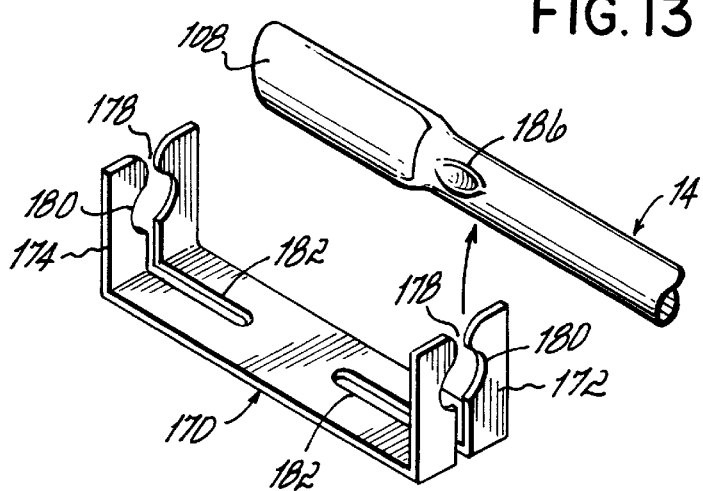
FIG. 14 is a perspective view illustrating another alternative embodiment of the clip portion of the coupling illustrated in FIG. 6.

A further alternative embodiment of a clip 170 is illustrated in FIG. 14. In this embodiment, each of the leg portions 172, 174 includes a slot 178 having an arcuate portion 180 that is sized to receive the ends 100, 106 of the jack handle rod 12 and the jack handle rod extension 14, respectively. The slots 178 have portions 182 extending beyond respective arcuate portions 180 to provide sides of the slots 178 with a resilient motion. The slots 178 are designed to permit the ends 172, 174 of the clip 170 to be manually pushed onto and releasably secured on the ends 100, 106 of the jack handle rod 12 and the jack handle rod extension, respectively. In addition, the end 106 of the jack handle rod extension 14 has wings or ears 186 to help prevent the clip 170 from sliding off of the jack handle rod extension 14.

While the invention has been illustrated by the description of several embodiments and while the embodiments have been described in considerable detail, there is no intention to restrict nor in any way limit the scope of the appended claims to such detail. Additional advantages and modifications will readily appear to those who are skilled in the art. For example, the above-described embodiments are described and illustrated with respect to a two-piece jack handle; however, as will be appreciated, the inventions described herein may be applied to jack handles having more than two pieces, that is, more than two lengths.

Further, the oval cross-section of the sleeve 110 may be formed from round tubing stock; or alternatively, the oval cross-section could be rolled to shape as part of the tube manufacturing process at the tube mill. Further, the sleeve 110 may be formed from sheet metal with a seam that is interlocked or welded or machined from a piece of solid stock.

The cross-section of the opening 112 in the sleeve 110 and the mating cross-section of the end 108 of the jack handle rod extension are, in different embodiments, shown as having elliptical and square cross-sections. However, the cross-sections may be triangular, hexagonal, octagonal or any other shape to permit the end 108 to drivingly engage the sleeve 110, that is, be inserted in the bore 112 and not be able to rotate relative to the sleeve 110.

In the illustrated embodiments, the sleeve 110 is described as being fixed to the end 100 of the jack handle rod 12. Alternatively, the sleeve 110 can be fixed to the end 106 of the jack handle rod extension 14 and releasably coupled with the clip 118 to the end 100 of the jack handle rod 12. In addition, the clip 118 is described as being slidably mounted on the jack handle rod extension 14. As will be appreciated, the hole 126 in the end 122 of the clip 118 may be slid over the jack handle rod 12 and the end 124 of the clip 118 latched over the jack handle extension rod 106. Thus, the sleeve 110 and clip 118 may be connected to either the jack handle rod 12 or the jack handle extension 14 in any combination, and hence the sleeve 110 can be rigidly connected to and the bore 126 of the clip 118 simultaneously slid over either, the end 100 of the jack handle rod 12 or, the end 106 of the jack handle extension 14.

The end section 102 of the jack handle rod 12 is described as being noncircular to match the noncircular opening 112 in the sleeve 110. Alternatively, the end section 102 may be circular or any other shape, and one-half of the bore 112 may have a mating shape; and the sleeve 110 connected to the end section 102 by crimping, welding, etc. The other end of the bore 112 can have desired noncircular shape sized to receive the end section 108 of the jack handle rod extension 14. The above can be fabricated by manufacturing a first sleeve with a circular shape and a second sleeve with a noncircular shape and welding those to sleeve components together.

Therefore, the invention in its broadest aspects is not limited to the specific detail shown and described. Consequently, departures may be made from the details described herein without departing from the spirit and scope of the claims which follow.

What is claimed is:

1. A multi-piece handle for use in positioning a vehicle lifting jack beneath a vehicle and for rotating a spindle of that jack, the handle comprising:
    a jack handle rod having a first end adapted to engage and transmit rotary motion to a rotatable spindle of a vehicle lifting jack and an opposite end;
    a jack handle rod extension separate from the jack handle rod and having a first end with a noncircular cross-section portion; and
    a jack handle coupling for releasably connecting the jack handle rod and the jack handle rod extension in coaxial alignment and including
        a sleeve secured to the opposite end of the jack handle rod, the sleeve having an internal cavity receiving the noncircular cross-section portion of the first end of the jack handle rod extension in driving engagement, and
        a clip mounted to slide over a length of on one of the jack handle rod and the jack handle rod extension proximate one end of the sleeve, the clip extending over a full length of the sleeve and releasably attaching to the other of the jack handle rod and the jack handle rod extension proximate an opposite end of the sleeve, thereby preventing the first end of the jack handle rod extension from moving out of the sleeve of the jack handle rod.

2. The multi-piece handle of claim 1 wherein the clip is mounted proximate the first end of the jack handle rod extension, the clip having an opening sized to fit over the jack handle rod, thereby retaining the first end of the jack handle rod extension in the sleeve of the jack handle rod.

3. The multi-piece handle of claim 2 wherein the clip has one end with a hole slidably receiving the jack handle rod extension and an opposite end having the opening.

4. The multi-piece handle of claim 3 wherein the first end of the jack handle rod extension has a cross-section portion larger than the hole in the one end of the clip, thereby preventing the clip from sliding off the first end of the jack handle rod extension.

5. The multi-piece handle of claim 1 wherein the sleeve has a length and the clip has a length greater than the length of the sleeve.

6. The multi-piece handle of claim 1 wherein the clip captures the sleeve between opposed ends of the clip upon the opening engaging the jack handle rod, thereby securing the jack handle rod extension into the cavity of the sleeve of the jack handle rod.

7. The multi-piece handle of claim 1 wherein the clip is generally U-shaped.

8. The multi-piece handle of claim 1 wherein the clip is made of sheet metal.

9. The multi-piece handle of claim 1 wherein the jack handle rod has a circular cross-section.

10. The multi-piece handle of claim 1 wherein the jack handle rod extension has a circular cross-section.

11. The multi-piece handle of claim 1 wherein the jack handle rod has a noncircular cross-section.

12. The multi-piece handle of claim 1 wherein the jack handle rod extension has a noncircular cross-section.

13. The multi-piece handle of claim 1 wherein the jack handle rod has a square cross-section.

14. The multi-piece handle of claim 1 wherein the jack handle rod extension has a square cross-section.

15. The multi-piece handle of claim 1 wherein the first end of the jack handle rod extension has a portion with a cross-section adapted to be received in slip-fit driving relationship into a receptacle of a drive tube for operating a spare tire winch located on the underside of a motor vehicle.

16. A multi-piece handle for use in positioning a vehicle lifting jack beneath a vehicle and for rotating a spindle of that jack, the handle comprising:
    a jack handle rod having a first end adapted to engage and transmit rotary motion to a rotatable spindle of a vehicle lifting jack and an opposite end;
    a jack handle rod extension separate from the jack handle rod and having a first end with a noncircular cross-section portion; and
    a jack handle coupling for releasably connecting the jack handle rod and the jack handle rod extension in coaxial alignment and including
        a sleeve secured to the opposite end of the jack handle rod, the sleeve having an internal cavity receiving the noncircular cross-section portion of the first end of the jack handle rod extension in driving engagement, and
        a clip extending over a full length of the sleeve and connected to the jack handle rod and the jack handle rod extension to prevent separation of the first end of the jack handle rod extension from the sleeve.

17. A multi-piece handle for use in positioning a vehicle lifting jack beneath a vehicle and for rotating a spindle of that jack, the handle comprising:
    a jack handle rod, a jack handle rod extension, and a jack handle coupling for releasably connecting the jack handle rod and the jack handle rod extension in coaxial alignment;
    a jack handle rod having a formed tip at a first end and an opposite end, the formed tip being adapted to engage and transmit rotary motion to a rotatable spindle of a vehicle lifting jack;
    the jack handle rod extension having a first end with a noncircular cross-section portion, and a shaped end formed on the opposite end, the shaped end having at least one flat surface adapted to releasably cooperate with a flat surface of a rotatable handle such that rotation of the handle effects rotation of the jack handle rod; and a jack handle coupling for releasably connecting the jack handle rod and the jack handle rod extension in coaxial alignment and including a sleeve secured to the opposite end of the jack handle rod, the sleeve having an extension portion extending beyond the opposite end of the jack handle rod, the extension portion of the sleeve having an internal cavity receiving the noncircular cross-section portion of the first end of the jack handle rod extension, and a clip extending over a full length of the sleeve and being simultaneously attached to the jack handle rod extension and the jack handle rod proximate ends of the sleeve, thereby retaining the first end of the jack handle rod extension in the sleeve of the jack handle rod.

18. The multi-piece handle of claim 17 wherein the clip is slidably mounted on one of the first end of the jack handle rod extension and the opposite end of the jack handle rod, the clip having a slotted opening sized to fit over the other of the jack handle rod and the jack handle rod extension upon the noncircular cross-section portion of the jack handle rod extension being inserted in the cavity of the sleeve, thereby retaining the first end of the jack handle rod extension in the sleeve of the jack handle rod.

19. The multi-piece handle of claim 17 wherein the jack handle rod extension has a pair of opposed flats formed thereon, the pair of opposed flats being adapted to be received in slip-fit driving relationship into a receptacle of a drive tube for operating a spare tire winch located on the underside of a motor vehicle.

20. A multi-piece handle for use in positioning a vehicle lifting jack beneath a vehicle and for rotating a spindle of that jack, the handle comprising:

a jack handle rod, a jack handle rod extension, and a jack handle coupling for releasably connecting the jack handle rod and the jack handle rod extension in coaxial alignment;

the jack handle rod having a formed tip at a first end and an opposite end, the formed tip being adapted to engage and transmit rotary motion to a rotatable spindle of a vehicle lifting jack;

the jack handle rod extension having a first end and a shaped opposite end, the shaped opposite end having at least one flat surface adapted to releasably cooperate with a flat surface of a rotatable handle such that rotation of the handle effects rotation of the jack handle rod;

the jack handle coupling having a sleeve secured to one of the opposite end of the jack handle rod and the first end of the jack handle rod extension, the sleeve having an extension portion extending beyond the one of the opposite end of the jack handle rod and the first end of the jack handle rod extension, the extension portion of the sleeve having an internal receptacle receiving the other of the opposite end of the jack handle rod and the first end of the jack handle rod extension in driving engagement; and a clip extending over a full length of the sleeve and releasably connected to the jack handle rod and the jack handle rod extension proximate ends of the sleeve to prevent separation of the jack handle rod and the jack handle rod extension.

21. A multi-piece handle for use in positioning a vehicle lifting jack beneath a vehicle and for rotating a spindle of that jack, the handle comprising:

a jack handle rod, a jack handle rod extension, and a jack handle coupling for releasably connecting the jack handle rod and the jack handle rod extension in coaxial alignment;

the jack handle rod having a formed tip at a first end and an opposite end, the formed tip being adapted to engage and transmit rotary motion to a rotatable spindle of a vehicle lifting jack;

the jack handle rod extension having a first end with a noncircular cross-section portion, and a shaped opposite end, the shaped opposite end having at least one flat surface adapted to releasably cooperate with a flat surface of a rotatable handle such that rotation of the handle effects rotation of the jack handle rod; and the jack handle coupling having a sleeve secured to the opposite end of the jack handle rod, the sleeve having an extension portion extending beyond the opposite end of the jack handle rod, the extension portion of the sleeve having an internal cavity receiving the noncircular cross-section portion of the first end of the jack handle rod extension, and a clip slidingly mounted on the jack handle rod extension and being blocked from sliding motion by the noncircular portion of the jack handle rod extension, the clip having an opening releasably connecting the clip to the jack handle rod, the opening being smaller than the sleeve, thereby retaining the first end of the jack handle rod extension in the sleeve of the jack handle rod.

22. A multi-piece handle for use in positioning a vehicle lifting jack beneath a vehicle and for rotating a spindle of the jack, the handle comprising:

a jack handle rod having a first end adapted to engage and transmit rotary motion to a spindle of a vehicle lifting jack and an opposite end;

a jack handle rod extension separate from the jack handle rod and having a first end with a noncircular cross-section portion; and a jack handle coupling for releasably connecting the jack handle rod and the jack handle rod extension in coaxial alignment and including a sleeve secured to the opposite end of the jack handle rod, the sleeve having an internal cavity receiving the noncircular cross-section portion of the first end of the jack handle rod extension in driving engagement, and a clip having one end slidingly mounted over a length of one of the jack handle rod and the jack handle rod extension and an opposite end releasably attached to the other of the jack handle rod and the jack handle rod extension, the clip thus extending over a full length of the sleeve to capture the sleeve and the noncircular cross-section portion of the jack handle extension within the sleeve between the ends of the clip, thereby preventing the first end of the jack handle rod extension from moving out of the sleeve of the jack handle rod.

23. The multi-piece handle of claim 22 wherein the opening is a slotted opening.

24. A multi-piece handle for use in positioning a vehicle lifting jack beneath a vehicle and for rotating a spindle of the jack, the handle comprising:

a jack handle rod having a first end adapted to engage and transmit rotary motion to a spindle of a vehicle lifting jack and an opposite end;

a jack handle rod extension separate from the jack handle rod and having a first end with a noncircular cross-section portion; and a jack handle coupling for releasably connecting the jack handle rod and the jack handle rod extension in coaxial alignment and including a sleeve secured to the opposite end of the jack handle rod, the sleeve having an internal cavity receiving the noncircular cross-section portion of the first end of the jack handle rod extension in driving engagement, and a clip having one end slidingly mounted over a length of one of the jack handle rod and the jack handle rod extension and the clip extending over a full length of the sleeve with an opposite end having an opening releasably connecting the clip to the other of the jack handle rod and the jack handle rod extension, thereby preventing the first end of the jack handle rod extension from moving out of the sleeve of the jack handle rod.

25. A multi-piece handle for use in positioning a vehicle lifting jack beneath a vehicle and for rotating a spindle of the jack, the handle comprising:

a jack handle rod having a first end adapted to engage and transmit rotary motion to a spindle of a vehicle lifting jack and an opposite end;

a jack handle rod extension separate from the jack handle rod and having a first end with a noncircular cross-section portion; and a jack handle coupling for releasably connecting the jack handle rod and the jack handle rod extension in coaxial alignment and including a sleeve secured to the opposite end of the jack handle rod, the sleeve having an internal cavity receiving the noncircular cross-section portion of the first end of the jack handle rod extension in driving engagement, and a clip having one end a hole receiving one of the jack handle rod and the jack handle rod extension and the clip having an opposite end with a slotted opening releasably connecting the clip to the other of the jack handle rod and the jack handle rod extension, thereby preventing the first end of the jack handle rod extension from moving out of the sleeve of the jack handle rod.

* * * * *